Inventor:
LEON GOUY
BY Louise O'Neil
Attorney

Patented Aug. 17, 1948

2,447,008

UNITED STATES PATENT OFFICE 2,447,008

UNITARY VAPOR ELIMINATOR AND FUEL METER FOR USE IN FUEL FEED SYSTEMS OF AIRCRAFT

Léon Gouy, Geneva, Switzerland; vested in the Attorney General of the United States Application October 22, 1942, Serial No. 462,981
In France October 23, 1941

5 Claims. (Cl. 158—36.3)

In most of the fuel feed systems on aircraft it is necessary, when such aircraft are intended to fly at high altitudes (8000 to 10,000 meters) to provide the pipelines with gas purging devices.

These devices perform various functions, thus:

(a) They insure removal of the gases contained in the fuel and consequently prevent these gases from causing the meters to give incorrect indications.

(b) They make it possible to purge the air contained in the pipe lines when the fuel circulation is started.

In prior art arrangements, the purging devices are constituted of elements separated from the meter.

This increases the encumbering weight of the installation which is very disadvantageous in aircraft where decrease in weight and space consumed are always sought for.

Moreover, the degassing is effected from a body of fuel which is not churned up and consequently the degassing is imperfect.

The object of the present invention is to avoid these drawbacks and to provide a fuel circulation system, especially for aircraft, which is of minimum weight and encumbrance and which efficiently eliminates the gases contained in the fuel and makes it possible to eliminate the measurement errors produced by the presence of these gases.

A further object of the invention is to effect the degassing at the instant that the liquid is being churned up, for example by the meter, thus resulting in achieving a very energetic degassing.

The improved fuel circulation arrangement which makes it possible to achieve the foregoing objects has the features recited in the specification given below and especially those pointed out in the claims appended to this specification.

An equipment according to the invention and mounted on board of an airplane is shown by way of example in the appended drawings in which.

Figure 1:
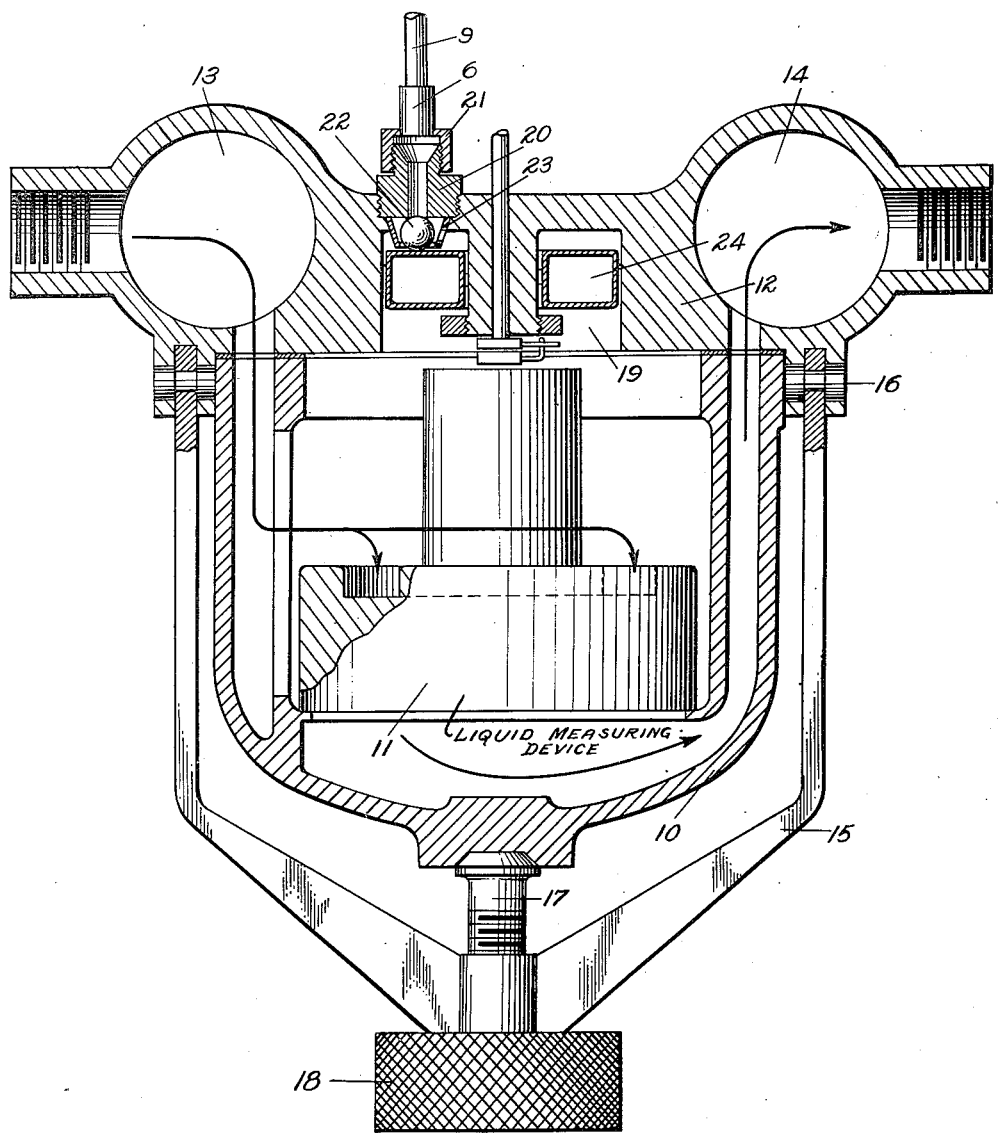
Figure 1 is an axial sectional view of the meter.
Figure 2:
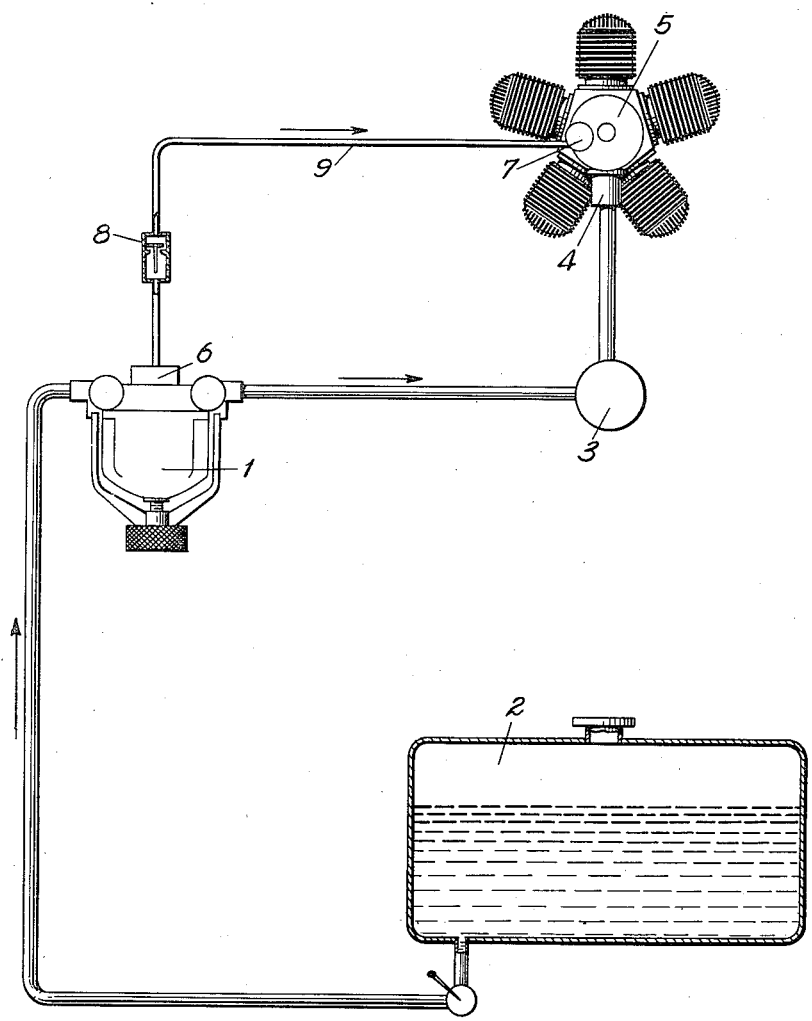
Figure 2 is a general view of the equipment in which the meter is mounted.

The equipment comprises a meter 1 supplied with fuel from a container 2. A pump 3 draws the fuel from the meter 1 and forces it into the carburettor 4 of the engine 5.

The meter 1 is provided with a device 6 which removes the gases and which is connected through a pipe with a suction device 7 such as a pump, venturi, carburettor and the like. A back-pressure member 8 formed, for instance, of a valve with its seat is mounted in the pipe 9 and avoids any return of air into the meter when the working of the drawing device 7 is stopped.

The meter which is shown in detail in Figure 1 is formed of two principal elements, viz.:

1. A lower part 10 which contains the measuring members 11 and

2. A head 12 in which the branch pipe 13 for the supply of the fuel and the branch pipe 14 for the outlet of the fuel are provided.

A stirrup 15 pivotally secured at 16 on the head 12 of the meter carries a binding screw 17 with a knurled knob 18, the said screw when resting against the stirrup 15 pushes the lower part 10 of the casing into contact with the meter head 12, which insures the exact application of both those elements on another (Figure 1).

On the contrary, when loosing the screw 17 and tilting the stirrup 15, it is possible instantaneously to separate the lower part 10 from the meter head 12.

According to the invention a gas collecting chamber 19 is provided in the meter head 12.

A gas removing device 6 is mounted in the meter head and connected with the gas collecting chamber 19. This gas removing device is formed of a connecting piece 20 screwed onto the meter head 12 and receiving a nut 21 which presses the extremity of the gas removing pipe 9 onto the said connection piece.

A ball 22 is mounted in the perforated cage 23 and can either be applied against the lower passage of the connection piece 20 and close it, or, on the contrary, rest on the bottom of the perforated cage 23 and then open the communication between the collecting chamber 19 and the gas removing conduit 9.

The ball 22 is urged by a float 24 floating on the fuel body contained in the meter.

The working of the above described device is as follows:

When the liquid fuel completely fills the casing of the meter the float 24 is in its higher position as shown in Figure 1; the ball 22 is lifted and closes the axial bore of the connecting piece 20; any communication is cut between the meter and the suction pump 7; the meter works in the ordinary manner without any change.

If a substantial quantity of gas collects in the collecting chamber 19 the level of the liquid fuel sinks and the float 24 also is lowered; the ball comes to rest on the bottom of the perforated cage 23; the axial bore of the connection piece 20 is open and a free communication is established between the collecting chamber 19 and the suction pump 7; the said pump draws up the gases which have collected in the collecting chamber 19 and forces them to the outside where they are recovered.

When the gases are thus removed the liquid fuel collects anew in the casing 10; its level rises and the float 24 also rises; then the ball 22 which is pushed by the float comes to apply anew against the middle bore of the connection piece 20 and closes it; the meter has thus returned to its initial position and it works in the ordinary manner.

In the case when the suction pump 7 is stopped and does no longer effect its suction in the pipe 9, the flap valve 8 falls onto its seat again and thus cuts off the communication between the gas removing device 6 and the suction pump 7; this has for its effect that any return of air from the suction pump 7 into the meter 1 and any mixing of this air with the fuel are avoided.

Summing up: according to the invention an equipment is provided which effectively insures the removing of the gases while avoiding the measuring errors caused by the said gases and having nevertheless a minimum weight and requiring a minimum space.

The combining of the meter with the degassing device in the same enclosure makes it possible to effect the degassing from above the train of gears of the meter, which, by their rotation, facilitate rising of the bubbles towards the degassing device, since the liquid is being constantly churned up.

I claim:

1. In a fuel supply system for an aeroplane engine or the like, said system being of the type involving a feed line leading from a supply to the carbureter of the engine with a pump connected between the supply and the carbureter; a fuel metering and devaporizing device connected in the feed line between the supply and said pump; said device comprising a casing containing metering means in the lower part thereof and a head closing the top of the casing, fuel entrance and exit means on said device, means for directing the fuel flow from the fuel entrance means to that portion of the casing above the metering means, through the metering means and thence out of the casing by way of said exit means, whereby the fuel from the fuel supply line can enter the casing to be metered therein and pass again into the fuel feed line toward the carbureter, said head being formed with a relatively large diameter vapor collecting chamber substantially directly above said metering means and open at its lower end to the upper part of the interior of said casing whereby air and vapor can accumulate while the fuel in the casing is at a low level, a relatively large diameter float positioned in said vapor chamber and arranged to rise and fall freely with the rise and fall of the fuel level in said casing and chamber, a vapor withdrawing conduit leading from said chamber to a suction element on said engine, and a normally open free valve arranged to be operated to close said conduit by a rise of said float above a predetermined level.

2. In a fuel supply system for an aeroplane or similar engine having a fuel supply, a fuel pump, a carbureter and a suction element other than the carbureter, a fuel feed line leading from the supply to the carbureter and containing said fuel pump, and a device having fuel entrance and exit means connected in the fuel line between the said supply and the fuel pump, said device comprising a liquid fuel receiver in circuit with the fuel feed line, metering means in the lower part of said receiver, a vapor and air receiver located in the device substantially directly above said metering means and communicating with the liquid fuel receiver and with said suction element only, and means for directing the fuel flow in the device from the fuel entrance means to that portion of said first receiver above the metering means, through the metering means and thence out of the first receiver to said fuel exit means, whereby liquid fuel reaches the carbureter without the air and vapor which is drawn off in said device.

3. In a flow meter, a meter containing casing for reception of the liquid to be metered and having an outlet for the liquid and an inlet for connection to a liquid supply whereby the liquid and any extraneous air enter the casing, metering means in the lower part of the casing, a head closing the top of the casing and formed with a large diameter air collecting chamber substantially directly above the metering means and open at its lower end to the casing and into which the level of the liquid in the casing can rise, means for directing the liquid flow from the casing inlet to that portion of the casing above the metering means, through the metering means and thence out of the casing by way of said casing outlet, a float positioned in said chamber, and an air releasing valve, said valve being closed at a predetermined elevation of said float and open in lower positions of the float, said valve comprising a valve body including a conduit leading from said chamber to release air accumulated therein, and a free valve element arranged to subside to an open position in any of the said lower positions of the float and to be engaged and lifted to closed position by the float as the float rises through said predetermined elevation.

4. A flow meter, according to claim 3, wherein said valve element consists of a cage and a free ball directly engageable by the float through opening means provided in said cage.

5. In a flow meter, a cylindrical meter containing casing for reception of the liquid to be metered and having an outlet for the liquid and an inlet for connection to a liquid supply whereby the liquid and any extraneous air enter the casing, metering means in the lower part of the casing, a head closing the top of the casing and formed with a large diameter substantially cylindrical air collecting chamber opening at its lower end into the casing substantially directly above said metering means, said chamber being substantially axially aligned with said casing, means for directing the liquid flow from the casing inlet to that portion of the casing above the metering means, through the metering means and thence out of the casing by way of said casing outlet, a centralized guide element depending from the top of said chamber, an annular float closely surrounding said guide element within said cylindrical chamber, stop means to prevent the float from subsiding into the casing, and an air releasing valve on said head in communication with said chamber said air reducing valve being operatively associated with said float whereby said valve is pushed up to closed position by the float as the float is elevated beyond a predetermined position by a corresponding rise of the liquid in the casing.

LÉON GOUY.

REFERENCES CITED

The following references are of record in the file of this patent:

UNITED STATES PATENTS

| Number | Name | Date |
| --- | --- | --- |
| 1,611,017 | Fuller | Dec. 14, 1926 |
| 1,736,033 | Barlow | Nov. 19, 1929 |
| 1,804,557 | Gould et al. | May 12, 1931 |
| 1,826,119 | Berndon | Oct. 6, 1931 |
| 2,268,957 | Muselier | Jan. 6, 1942 |